United States Patent
Davin et al.

[15] 3,700,288
[45] Oct. 24, 1972

[54] PAVING MACHINE

[72] Inventors: Donald R. Davin, Shelbyville; Gary H. Beckley, Mattoon, both of Ill.

[73] Assignee: Blaw Knox Constuction Equipment, Inc., Mattoon, Ill.

[22] Filed: Dec. 31, 1969

[21] Appl. No.: 889,542

[52] U.S. Cl. .....................305/38, 180/6.48, 305/10, 305/27
[51] Int. Cl. ............................................B62d 55/24
[58] Field of Search.....305/37, 38, 40, 41, 36, 35 EB

[56] References Cited

UNITED STATES PATENTS

| | | | |
|---|---|---|---|
| 2,392,988 | 1/1946 | Keck | 305/46 |
| 2,420,133 | 5/1947 | Hardig | 305/57 |
| 2,541,177 | 2/1951 | Slemmons | 305/38 |
| 3,345,113 | 10/1967 | Siber | 305/38 X |
| 2,515,128 | 7/1950 | Lammertse | 305/38 |
| 2,796,303 | 6/1957 | Atkinson | 305/38 |
| 2,815,988 | 12/1957 | Dowell | 305/37 |
| 3,091,837 | 6/1963 | McCormick | 305/37 X |

*Primary Examiner*—Richard J. Johnson
*Attorney*—Mandeville and Schweitzer

[57] ABSTRACT

An asphalt paving machine mounted on rubber tread tracks. Each track is equally tensioned hydraulically. Each track is made of shoes which are individually connected to band sections. Replaceable rubber inserts are fastened to each shoe. Replaceable retains connected to each shoe engage bogie wheels which are attached to bogie carriages pivotally mounted on a torsionally flexible machine frame. A drive sprocket for each track is directly driven by a separate hydrostatic transmission with the sprocket supporting the track shoes and bands to maintain a constant pitch diameter for the track. The gear train between the hydrostatic motor and the sprocket is completely enclosed. A manual automatic engine speed control system is provided which automatically brings the paving machine engine to idle speed when the paving machine is stopped and brings the engine to its governed speed whenever the paving machine is moved. A closed center hydraulic system supplies fluid to operate power actuators.

10 Claims, 17 Drawing Figures

Patented Oct. 24, 1972
3,700,288
10 Sheets-Sheet 1
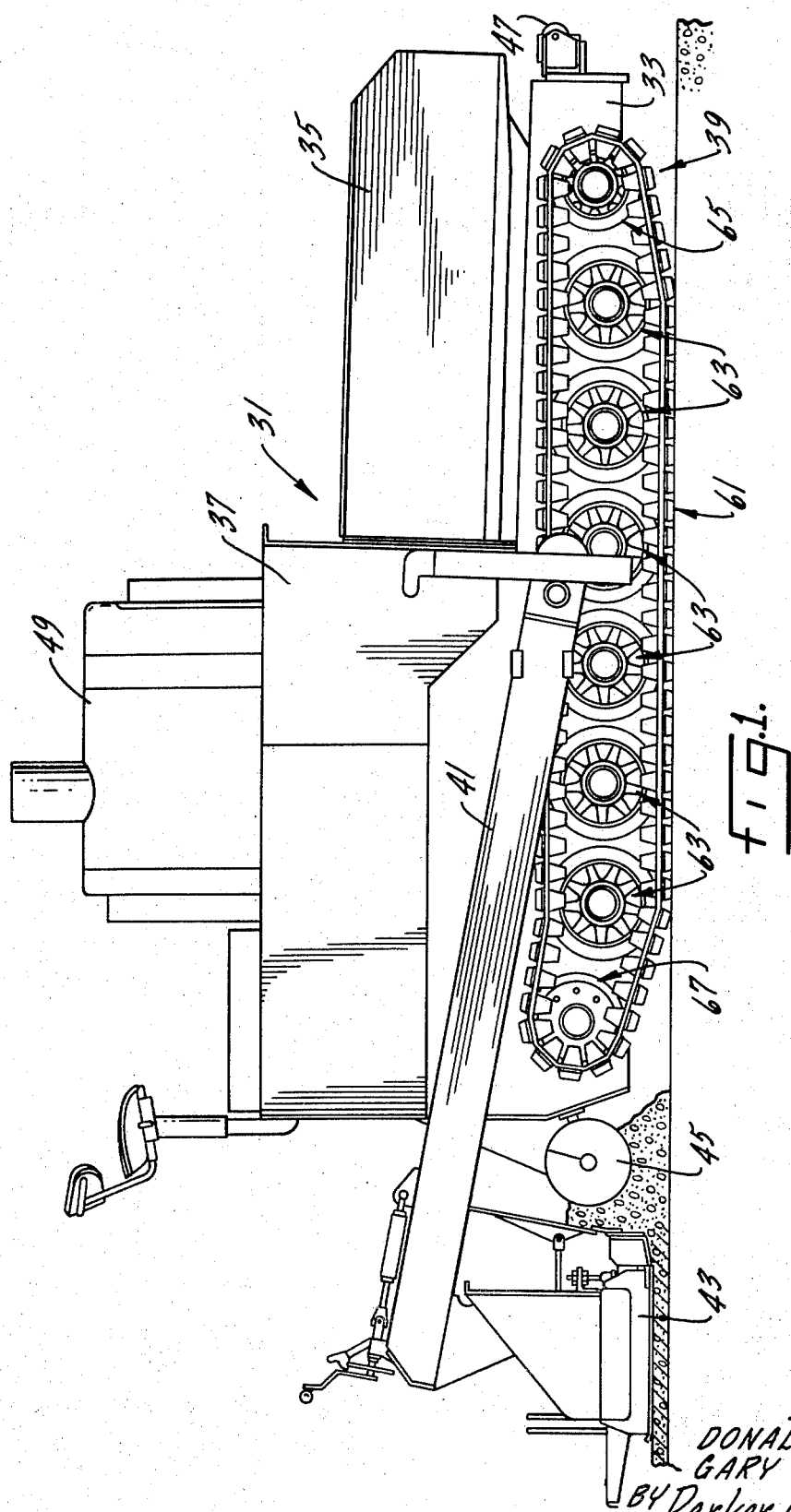
INVENTORS.
DONALD R. DAVIN
GARY H. BECKLEY
BY Parker, Carter & Markey
Attorneys.

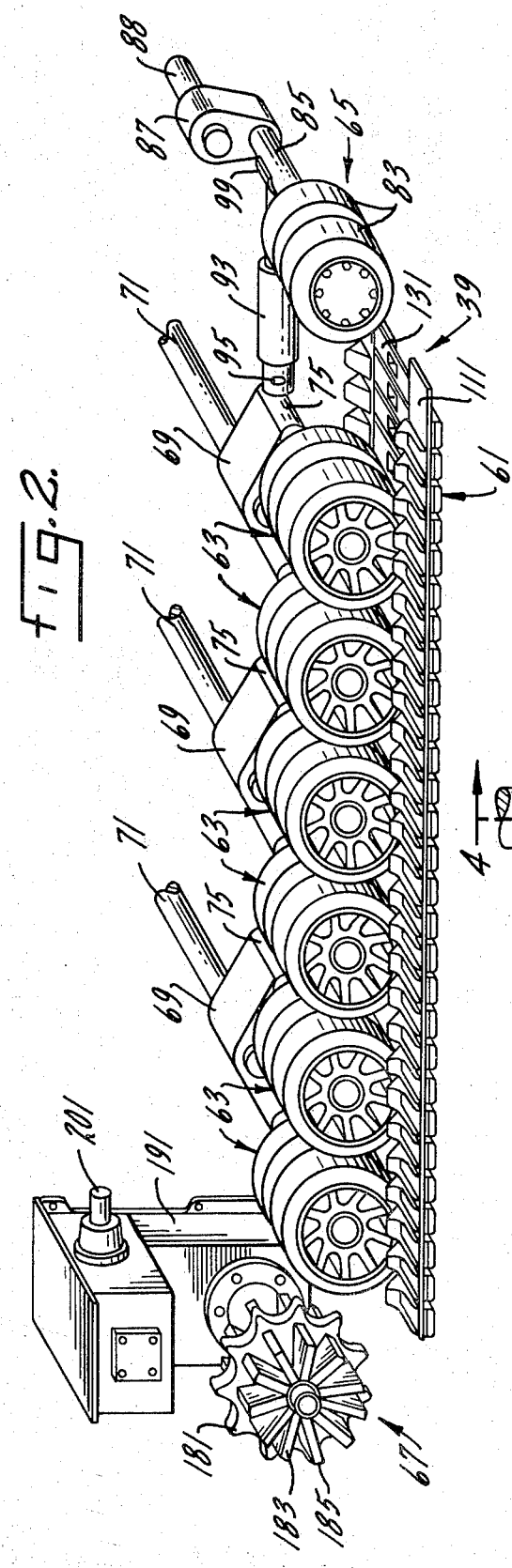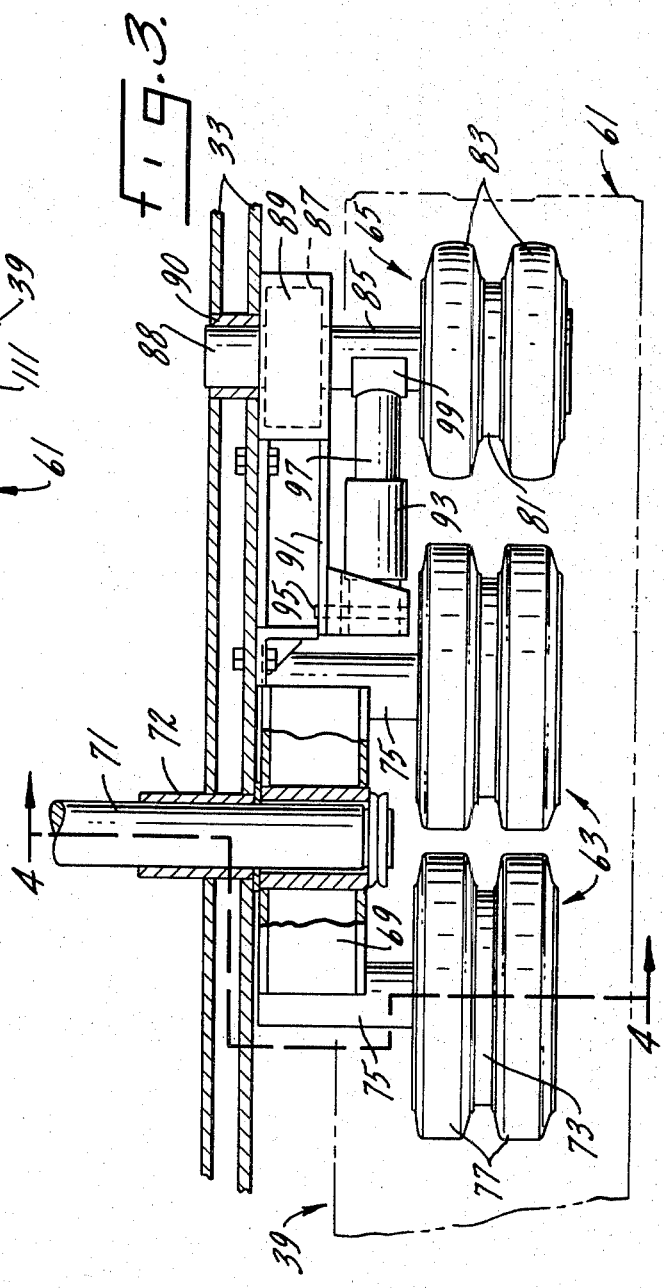

Patented Oct. 24, 1972

Patented Oct. 24, 1972

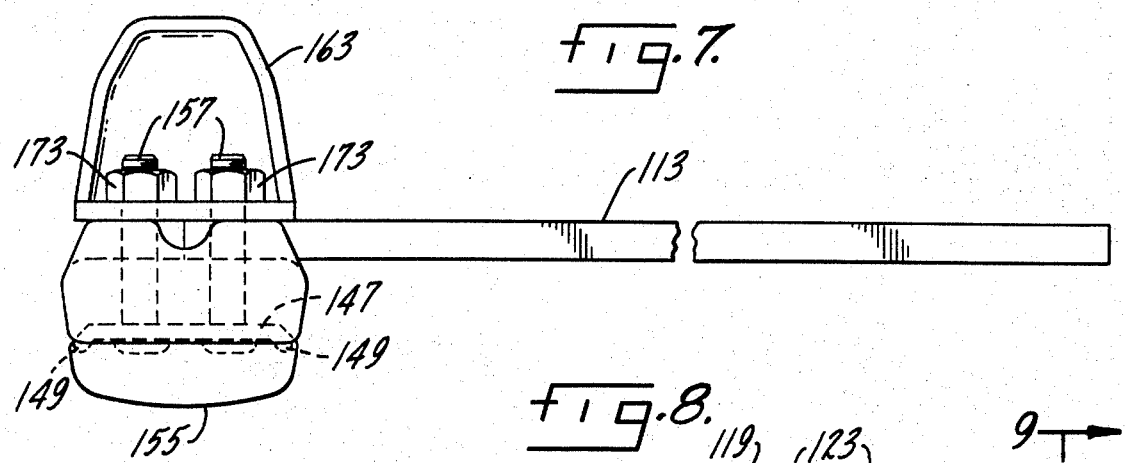
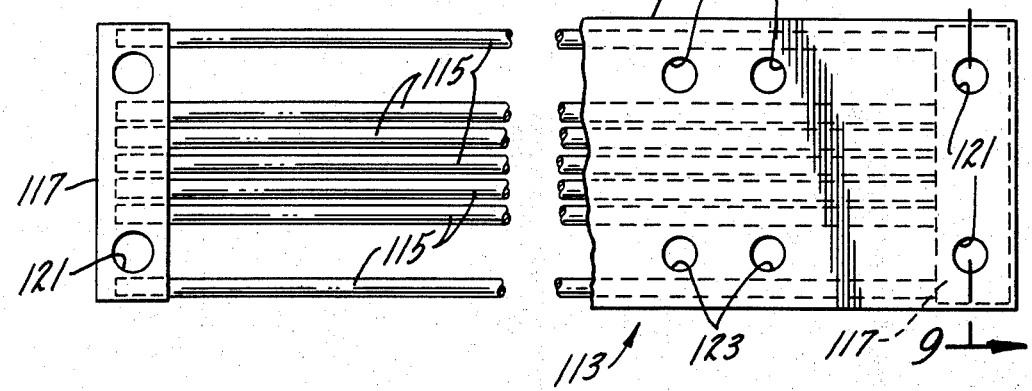
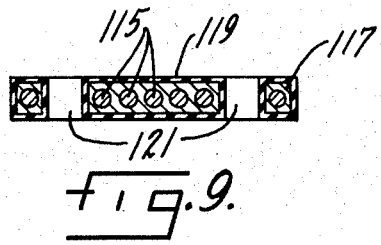
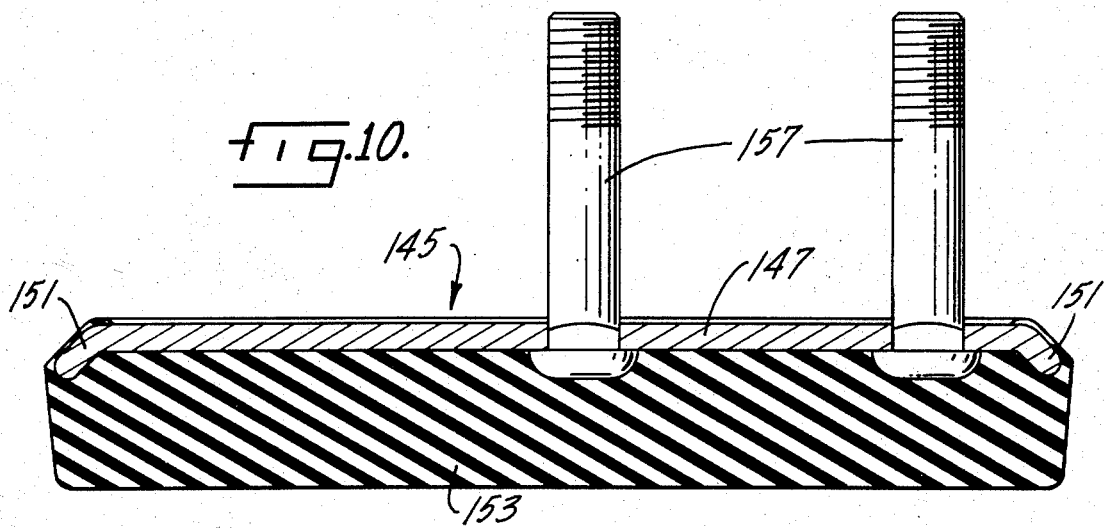

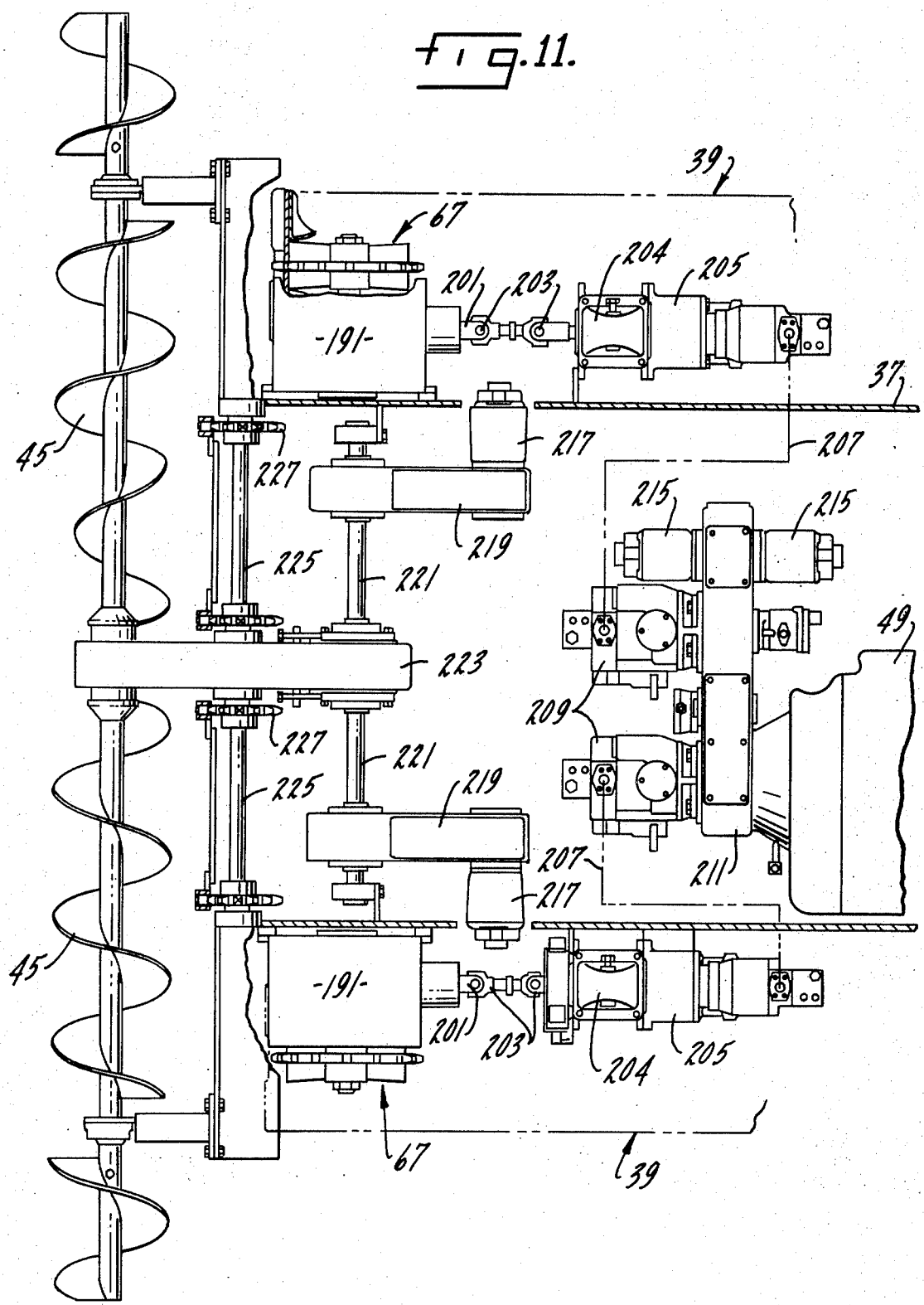

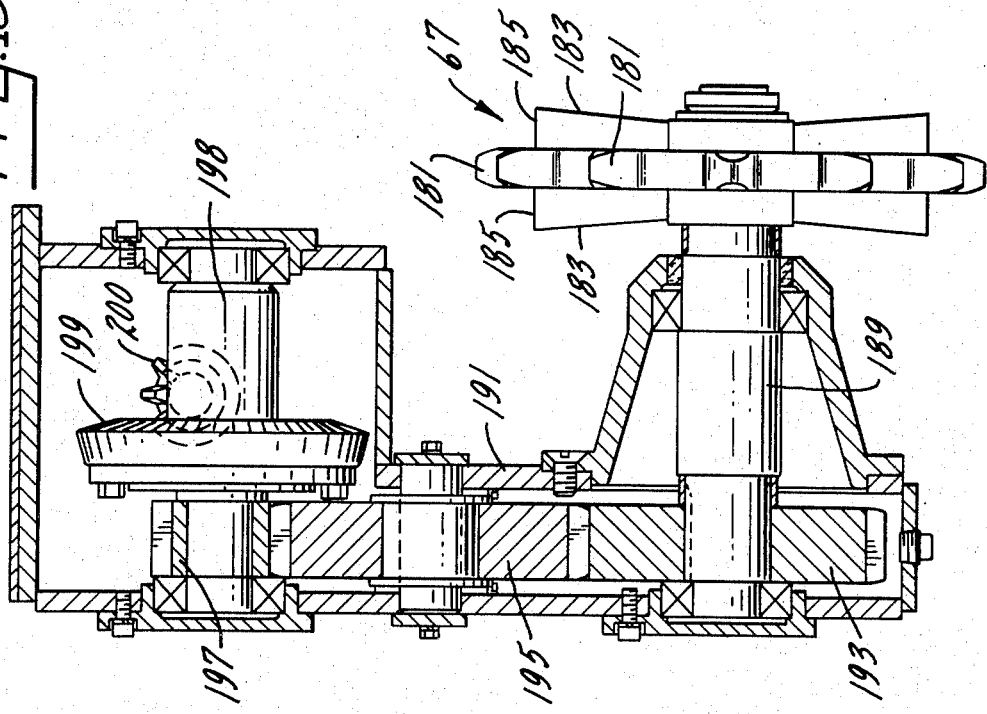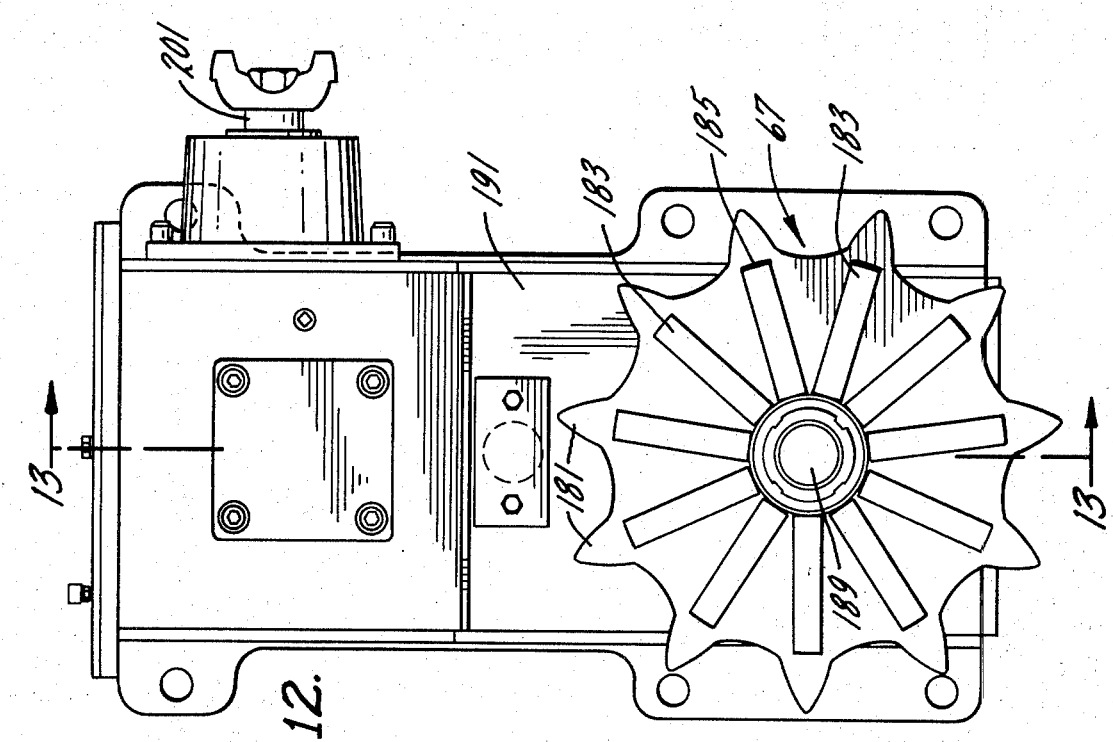

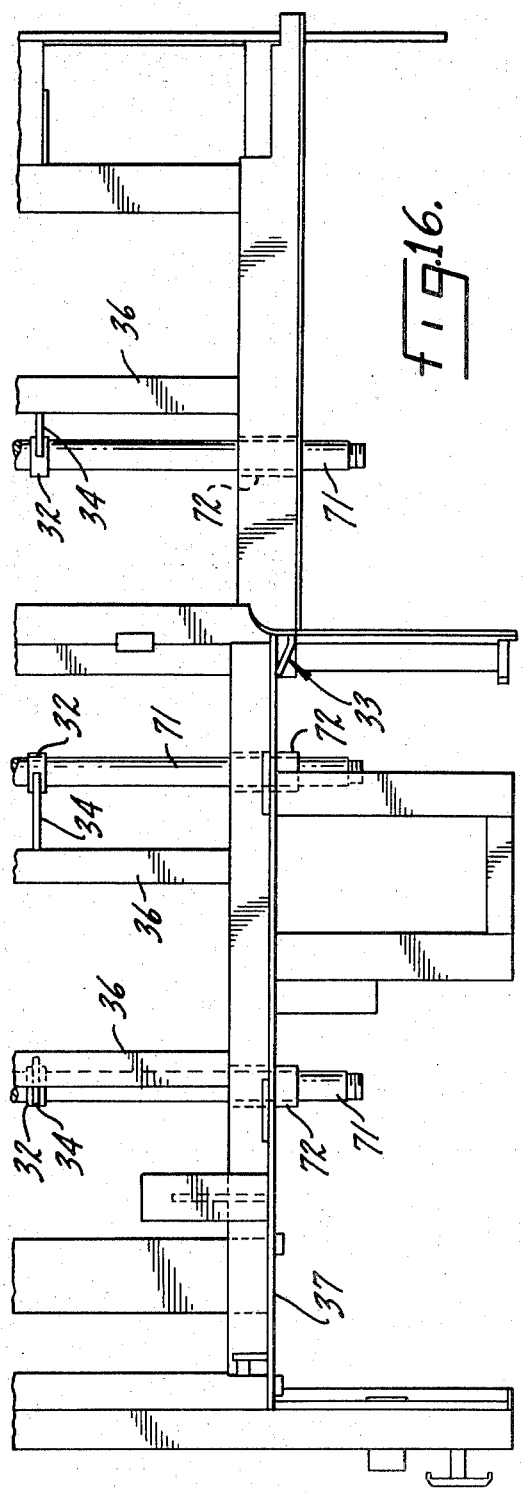
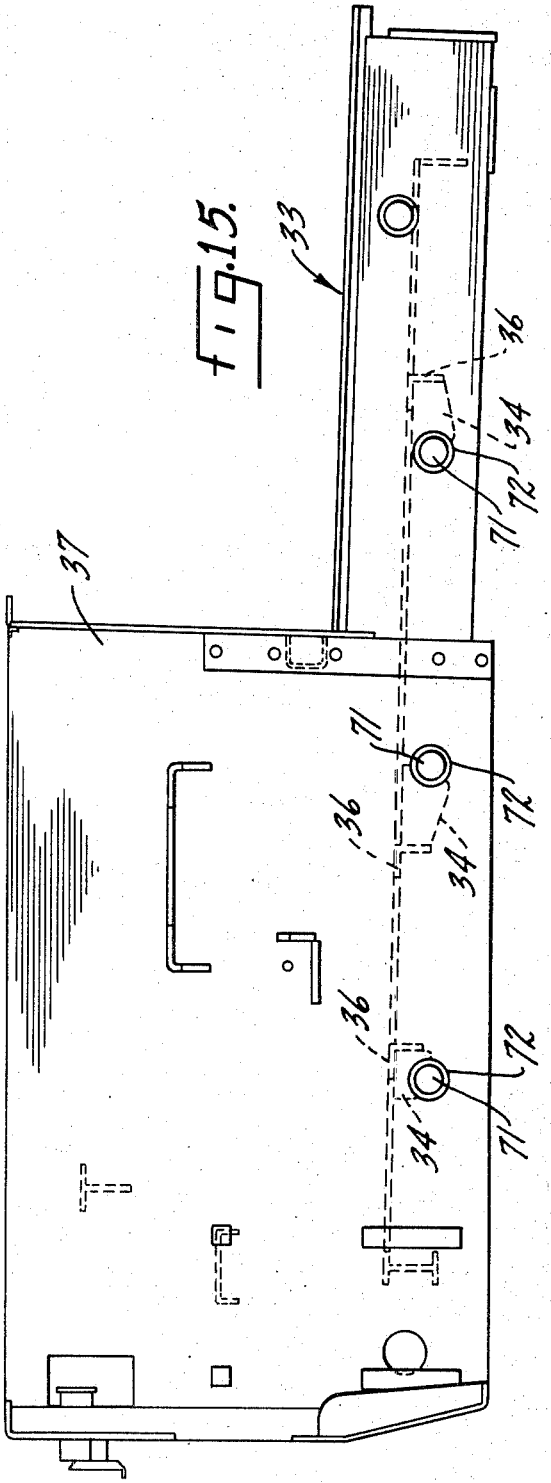

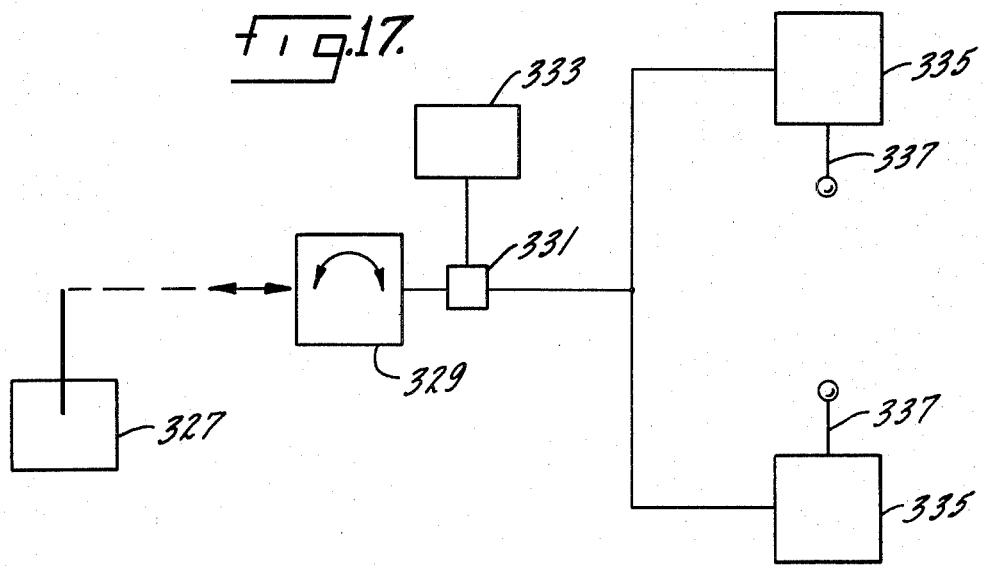

PAVING MACHINE

SUMMARY OF THE INVENTION

This invention is concerned with an asphalt paving machine and more particularly with a paving machine having track means to move the paving machine along a supporting surface.

An object of this invention is an asphalt paving machine having rubber tread track means.

Another object is a paving machine having track means which are individually driven.

Another object is a paving machine having track means which are individually driven by separately controlled hydrostatic transmissions.

Another object is a paving machine having track means which are uniformly tensioned by hydraulic mechanisms.

Another object is a paving machine having tracks driven by sprockets in which the drive train for each sprocket is totally enclosed.

Another object is a paving machine having tracks driven by sprockets in which the sprockets are gear driven by hydrostatic motors.

Another object is a tracked paving machine which may be pivoted about its center line.

Another object is a paving machine having a pair of tracks with a six point suspension system between the tracks and the torsionally flexible frame of the paving machine.

Another object is a paving machine having tracks in which the track drive sprockets support the track shoes and bands to maintain constant pitch diameters of the tracks.

Another object is a paving machine having a closed center hydraulic system for operating hydraulic actuators.

Another object is a paving machine having a manual automatic engine speed control in which the engine is brought to its idle speed when the paving machine is stopped and is automatically brought to its governed speed whenever the paving machine is moved.

Another object is track means for a paving machine or the like utilizing shoes connected to bands.

Another object is an endless track for a land vehicle which does not utilize pins to connect the shoes.

Another object is an endless track having metal shoes with replaceable rubber inserts.

Another object is an endless track in which the track retaining means are formed as separate parts connected to the shoes.

Another object is an endless track having shoes connected to bands in which the bands are made in sections.

Another object is an endless track guided on bogie wheels in which the side loads from the bogie wheels are transferred directly to the shoes.

Another object is a paving machine having an endless track in which the bogie wheels engaging the track are mounted in pairs on carriages which pivot about the paving machine frame.

Other objects may be found in the following specifications claims and drawings.

BRIEF DESCRIPTION OF THE DRAWINGS

The invention is illustrated more or less diagramatically in the following drawings wherein:

FIG. 1 is a side elevational view of a paving machine embodying the novel features of this invention;

FIG. 2 is an enlarged, perspective, partial view of the track mechanism of this invention with parts broken away and others omitted for clarity of illustration;

FIG. 3 is an enlarged partial plan view of the track mechanism of FIG. 2 with some parts broken away and others shown in phantom;

FIG. 7 is a partial side elevational view of a section of track;

FIG. 8 is a plan view of a track band section with parts broken away and others omitted for clarity of illustration;

FIG. 9 is a cross-sectional view taken along line 9—9 of FIG. 8;

FIG. 10 is a vertical cross-sectional view of a track shoe insert;

FIG. 11 is a partial plan view of the drive mechanisms of the paving machine;

FIG. 12 is a side elevational view of the track driving sprocket and its gear housing;

FIG. 13 is a cross-sectional view taken along line 13—13 of FIG. 12;

FIG. 15 is a side elevational view of the paving machine frame;

FIG. 16 is a top plan view of one half of the paving machine frame; and

FIG. 17 is a schematic diagram of the paving machine engine speed control.

DESCRIPTION OF THE PREFERRED EMBODIMENT

Figure 4:
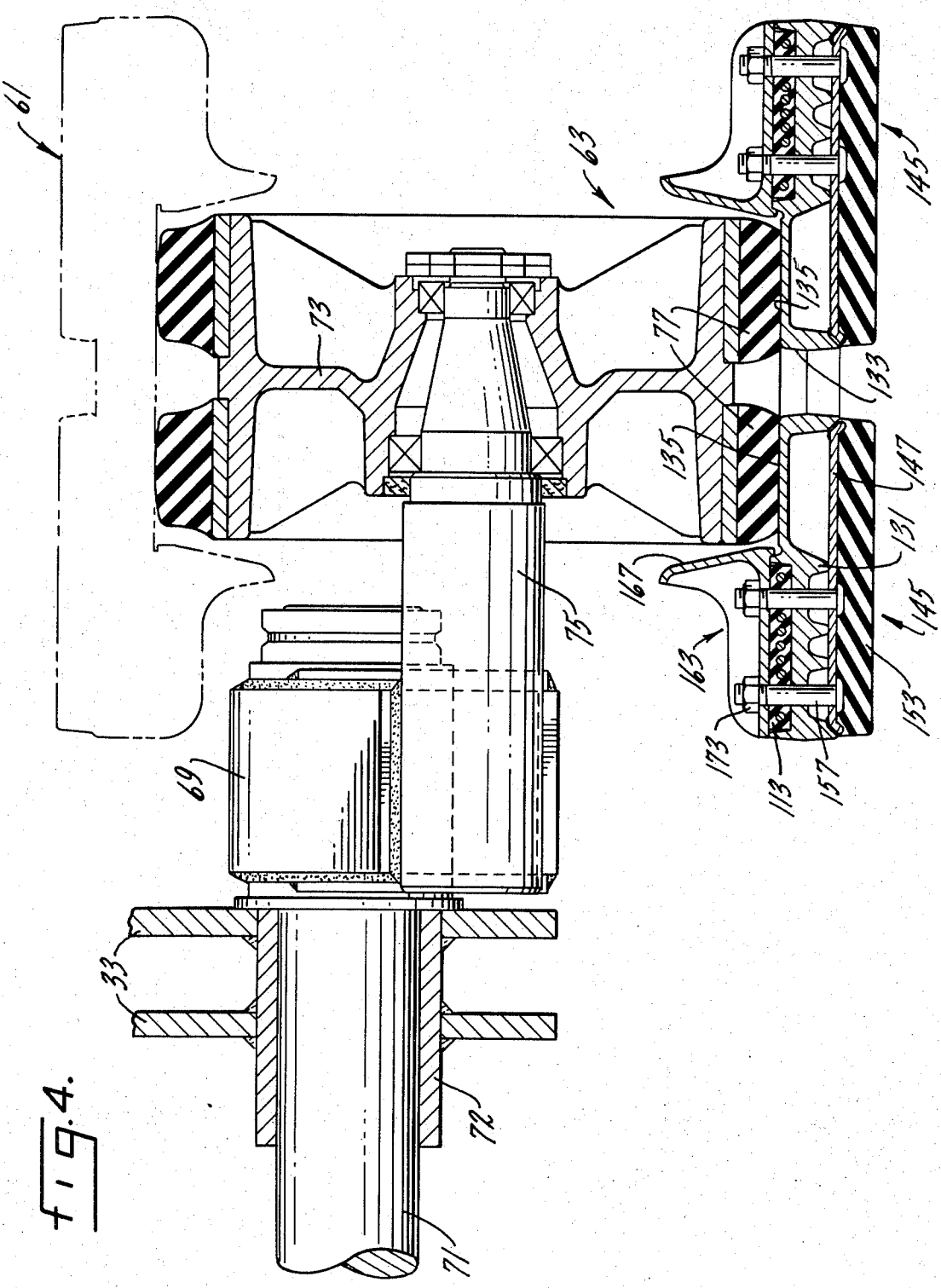
FIG. 4 is an enlarged cross-sectional view taken along line 4—4 of FIG. 3.

FIG. 1 of the drawings shows a paving machine 31 embodying the novel features of this invention. The paving machine includes a frame 33 on which is mounted a hopper 35 and a body 37. The paving machine rides on a pair of endless track means 39. Screed arms 41 mounted on the paving machine support a screed 43 located at the rear of the paving machine. Auger conveyors 45 are mounted forwardly of the screed. Truck push rollers 47 are mounted on the frame 33 forward of the hopper 35. The paving machine is powered by an engine 49 mounted on the body 37.

The endless track means of this invention are shown in more detail in FIGS. 2 through 10 of the drawings. FIG. 2 of the drawings shows a portion of the right hand endless track means. The endless track means 39 includes a track 61 which is guided around bogie wheels 63, a tensioning wheel 65 and a drive sprocket 67. Each pair of bogie wheels 63 is connected to the opposite ends of an elongated bogie carriage 69 which is journaled about a shaft 71. The shafts 71 extend across the paving machine and are affixed to sleeves 72 attached to the frame 33. See FIGS. 15 and 16. The shafts are supported near the center of the frame by collars 32 affixed to brackets 34. The brackets are attached to transversely extending angles 36. It should be noted that the frame 33 has no diagonal cross-bracing and this contributes to its torsional flexibility.

Referring particularly to FIGS. 3 and 4, each bogie wheel 63 includes a rim 73 mounted on a stub shaft 75 which is affixed to one end of the bogie carriage 69. A pair of hard rubber tires 77 are affixed to the rim 73 and are spaced laterally from each other.

The tensioning wheel 65, shown in FIGS. 2 and 3, includes a rim 81 on which is mounted a pair of laterally spaced rubber tires 83. The tensioning steel rim is journaled on a stub shaft 85 which is connected to a crank 87. The crank 87 is pivotally connected by a stub shaft 88 fixed to rotate within a sleeve 90 which is attached to the frame 33. The upper portion of the crank 87 is covered by a housing 89 (FIG. 3). This housing is formed as part of a bracket 91 which is fastened to the frame 33. A hydraulic cylinder and piston 93 is pivotally connected at one end by pivot pin 95 to the bracket 91. The piston rod 97 of the hydraulic cylinder 93 has an arcuate shaped seat 99 which engages the stub shaft 85 of the tensioning wheel 65.

Figure 6:
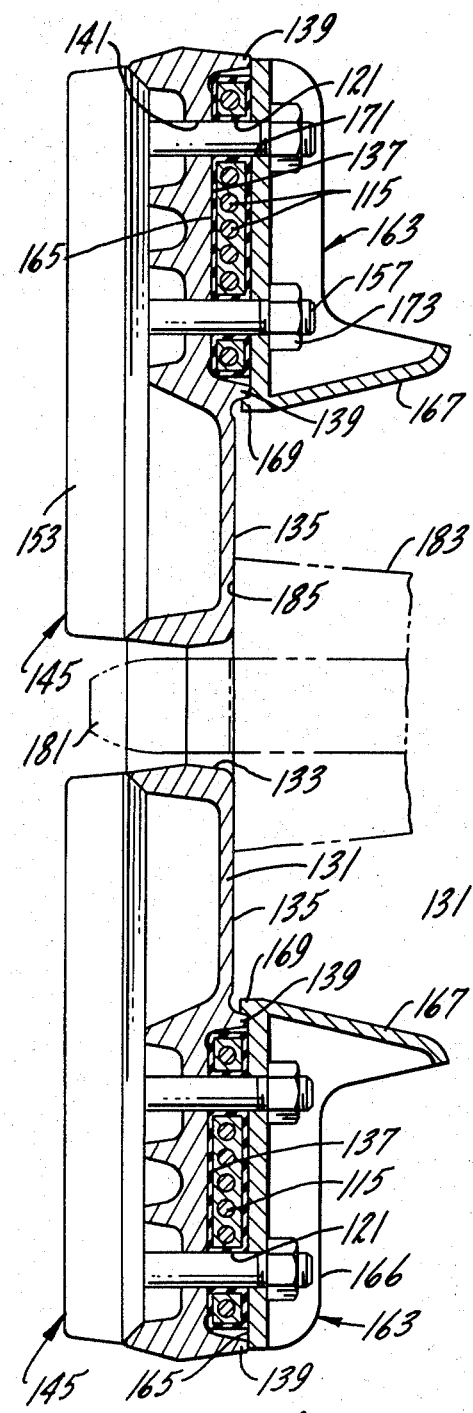
FIG. 6 is a cross-sectional view taken along line 6—6 of FIG. 5.
Figure 5:
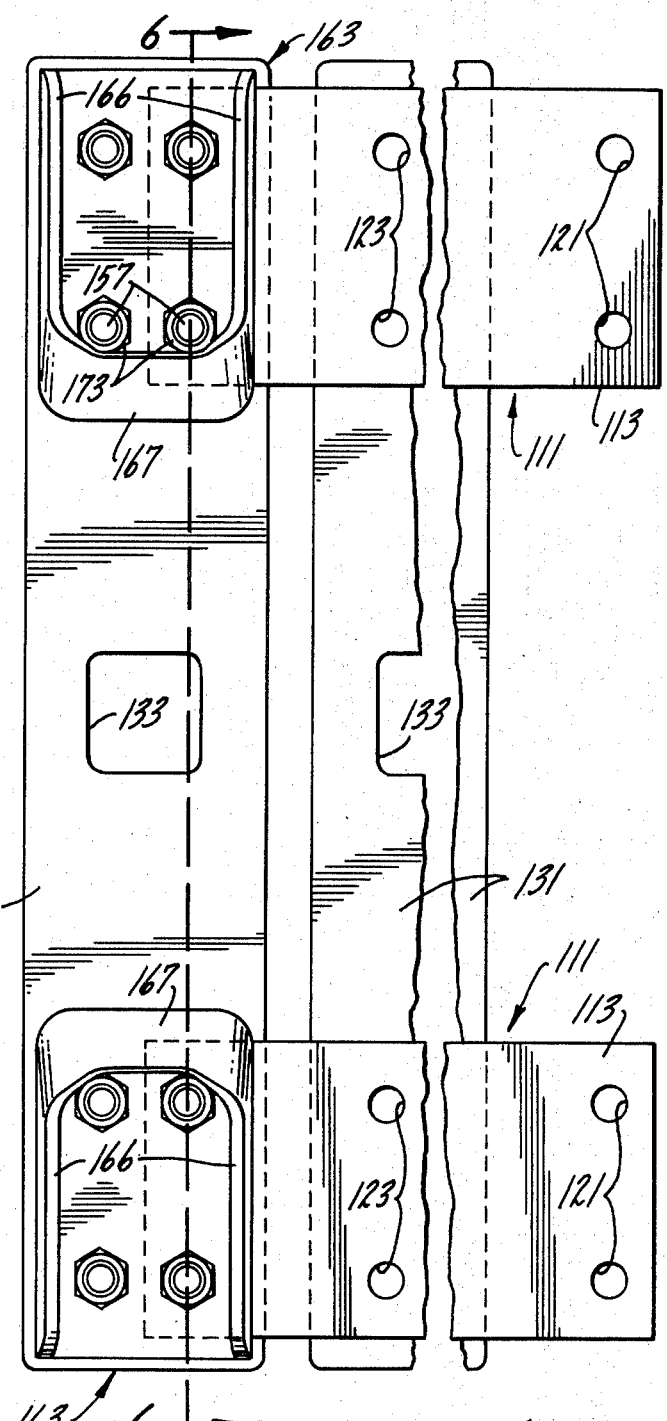
FIG. 5 is an enlarged, partial plan view of a section of track.

The track 61 is shown in detail in FIGS. 4 through 10, inclusive. Referring to FIGS. 5 and 6, the track includes a pair of bands 111, each of which is composed of a number of band sections 113 joined end to end. A typical band section is shown in detail in FIGS. 8 and 9. Each band section includes a number of steel cables 115 which are imbedded at their ends in anchor plates 117. The cables and anchor plates are encased in a rubber substance 119. Openings 121 are formed extending through the rubber and anchor plates 117 and openings 123 are formed through the rubber casing. The band sections 113 interconnect a plurality of shoes 131 to form the track 61.

The shoes 131 are shown in detail in FIGS. 5, 6 and 7. Each shoe 131 is a generally rectangular, elongated metal member having a centrally located sprocket opening 133. A pair of planar bogie tire engaging surfaces 135 are located on opposite sides of the sprocket opening 133 on the inside surface of the shoe. Channels 137 are formed in the shoe at the ends thereof to receive the band sections 113 in the manner shown in FIG. 6. Upstanding ribs 139 are formed on the shoes on opposite sides of the channels 137.

Connected to each shoe is a pair of rubber pad inserts 145 which are shown in detail in FIGS. 6, 7 and 10. Each insert consists of a flat, generally rectangular metal plate 147 having downturned side edges 149 and downturned end edges 151. A rubber pad 153 is molded to the under surface of the plate 147 and extends over the upper surfaces of the downturned edges 149 and 151 to cover a small part of the planar upper surface of the plate 147. The details of the insert are best shown in FIG. 10. It should also be noted that the downturned edges 149 and 151 of the plate 147 extend at an angle of about 45° with the planar portion of the plate. As can best be seen in FIG. 7, the rubber pad 153 has a convex wearing surface 155. Bolts 157 extend through plate 147 from the underside thereof with the heads of the bolts engaging the plate.

Retainers 163 are connected to opposite ends of each shoe 131. The retainers are shown in detail in FIGS. 5, 6 and 7. Each retainer has a generally planar surface 165 which engages and rests on the upstanding ribs 139 to span the channels 137 formed in the shoes. Each retainer has an upstanding generally U-shaped wall 166. The wall has a surface 167 which is positioned to face the sprocket opening 133 of the shoe 131. This surface is sloped generally outwardly from the planar surface 165. A downwardly extending lip 169 is formed on the retainer at the base of the surface 167 and engages the inner upstanding rib 139 to transfer side loads exerted against the retaining member directly to the shoe 131. Bolt openings 171 are formed through the planar surfaces 165 of the retainers. The bolts 157 of the rubber pad inserts 145 extend through openings 141 in the shoes, openings 121 and 123 in the band sections 113 and bolt openings 171 in the retainers and receive nuts 173 to fasten the shoes, retainers inserts, and band sections into the track unit 61.

The drive sprocket 67 is shown in detail in FIGS. 2, 12 and 13. The sprocket is formed with a plurality of teeth 181 adapted to mesh with the sprocket openings 133 in the shoes 131 as shown in phantom in FIG. 6. Formed on the sides of the sprocket and located radially inwardly of the teeth 181 are radially extending segments 183 having end surfaces 185 which form an interrupted rim on each side of the sprocket. As can be seen in FIG. 6, the rim surfaces 185 engage the planar surfaces 135 on the shoes 131 when the teeth 181 mesh in the openings 133 of the shoes.

Referring to FIG. 13, the sprocket 67 is mounted on a shaft 189 which is journaled on bearings in the transmission housing 191. A gear 193 affixed to the opposite end of shaft 189 meshes with idler gear 195. Idler gear 195 meshes with gear 197 affixed to shaft 198 which is journaled on bearings in the transmission housing. Bevel gear 199 affixed to shaft 198 engages a pinion gear 200 at the end of input shaft 201.

The input shaft 201 to the transmission housing shown in FIGS. 11 and 12 is connected by universal joints 203 to a three speed transmission 204 which connects to a hydrostatic traction motor 205. As seen in FIG. 11, a separate drive sprocket 67, transmission 204 and hydrostatic traction motor 205 are provided for each endless track means 39. Each hydrostatic traction motor 205 is provided with hydraulic fluid under pressure through conduits 207 leading from separate traction pumps 209. The traction pumps 209 are driven by the paving machine engine 49 through a suitable transmission 211.

Figure 14:
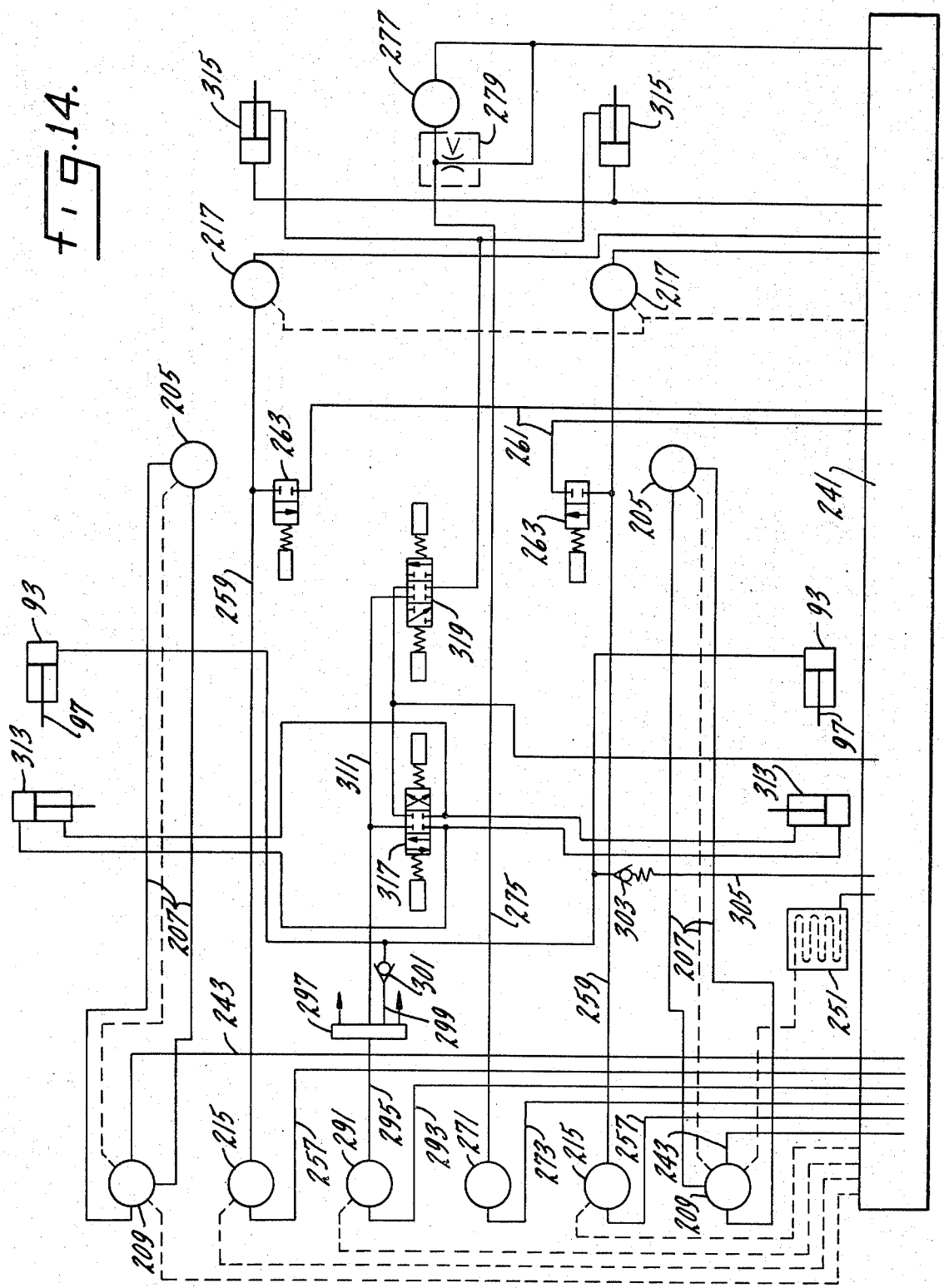
FIG. 14 is a schematic diagram of the hydraulic system of the paving machine.

The engine 49 also drives the right hand and left hand auger conveyor pumps 215 through the transmission 211. These pumps supply hydraulic fluid under pressure to the auger conveyor hydrostatic drive motors 217 through conduits 259 (FIG. 14). The right and left hand auger conveyors 45 are driven by the drive motors 217 through the reduction gears 219, drive shafts 221 and chain drive 223. With this arrangement, the drive for each auger conveyor 45 is independent of the drive for the other auger conveyor. The chain drive 223 also drives shafts 225 on which are mounted sprockets 227 which drive the slat conveyors (not shown). The slat conveyors carry the paving material from the hopper 35 to the auger conveyors 45.

FIG. 14 is a schematic drawing of the hydraulic systems of the paving machine. The hydraulic systems use a common hydraulic fluid reservoir 241. The traction pumps 209 obtain their hydraulic fluid from this reservoir through the suction conduits 243. The traction pumps 209 are of the axial piston type. These pumps supply hydraulic fluid to the traction motors 205 also of the axial piston type, through conduits 207. The hydraulic fluid used in the pumps 209 is cooled by a cooler 251.

Auger conveyor pumps 215 obtain hydraulic fluid from the reservoir 241 through suction conduits 257. The hydraulic fluid from the pumps 215 is supplied to the auger conveyor motors 217 through conduits 259. Connected in parallel with these conduits and the auger motors 217 are reservoir return conduits 261 controlled by solenoid operated valves 263.

A hydraulic pump 271 takes hydraulic fluid from the reservoir 241 through a conduit 273 and delivers the hydraulic fluid through conduit 275 to a hydraulic motor 277 which drives a screed vibrator (not shown). An adjustable orifice bypass 279 is provided around the motor 277.

A variable volume, constant pressure pump 291, obtains hydraulic fluid through conduit 293 from the reservoir 241. It supplies hydraulic fluid through a conduit 295 to a manifold 297. A number of conduits lead from this manifold. Among them is conduit 299 which splits into two branches and supplies hydraulic fluid to the track tensioning cylinders 93. A check valve 301 is provided in this conduit to prevent the backflow of hydraulic fluid from the cylinders to the manifold. A relief valve 303 is located in a conduit 305 connecting conduit 299 with the reservoir. The relief valve 301 is set to operate at a pressure slightly higher than the normal operating pressure of the hydraulic fluid in conduit 299.

A conduit 311 leading from the manifold 297 supplies hydraulic fluid to the hopper lift cylinders 313 and the screed lift cylinders 315 through solenoid operated directional control valves 317 and 319.

FIG. 17 is a schematic illustration of a speed control mechanism for the paving machine engine 49. Box 327 represents the engine throttle which may be a shaft or an arm. Box 329 represents a linear actuator which may be either a hydraulic cylinder or a cylinder operated by the engine vacuum. An electrically operated valve 331 controls the flow of fluid from a reservoir 333 to the linear actuator. The electric valve 331 is controlled by electrical limit switches 335 which are opened and closed by movement of the hydrostatic transmission control levers 337.

The use, operation and function of this invention are as follows:

The paving machine 31 of this invention is characterized by rubber tread tracks which are individually driven by separately controlled hydrostatic transmissions. The endless track means 39 of the paving machine is long wearing, permits high travel speed and increases the draw bar power of the paving machine while reducing maintenance and repair. The independent hydrostatic drive for each track enables the paving machine to be steered easily and provides infinitely variable power to each track. The independently variable hydrostatic drive for each track also permits the paving machine to be turned about its center line and enables the machine to pave smoothly around curves, eliminating all jogs.

The flexibility of the power train is further enhanced by the provision of the three speed transmissions 204 between the traction motors 205 and the drive sprockets 67. The shifting of this transmission, as the speed of the paver varies, maintains the hydraulic fluid being supplied to the traction motors 205 at the lowest pressure and highest volume for a given paver speed, thus maintaining maximum performance and efficiency.

Equal tension is maintained in each track by the hydraulic actuators 93. These actuators are supplied with hydraulic fluid through a common conduit 299 from the hydraulic fluid manifold 297. This improves the ability of the paving machine to travel in a straight line. The relief valve 303 provides an automatic release when the hydraulic pressure reaches a preselected setting.

The track 61 of this invention has been designed to eliminate or reduce wear and to provide for ease of maintenance and replacement of broken and worn track. The track 61 consists of four main replaceable components. These are the band sections 113, shoes 131, rubber pad inserts 145 for the shoes and retainers 163. The bolts 157 and nuts 173 which hold the inserts onto the shoes also connect the shoes and retainers to the band sections 113 and connect the band sections together in an endless band 111. As is shown in FIG. 5, band sections 113 connect at their ends to a pair of bolts of a common shoe to form the endless band 111. Thus, replacement and repairs of broken or worn parts in a track 61 can be accomplished simply by loosening the nuts 173 and removing the insert pad 153 and their attached bolts 157.

The retainers 163, which engage the bogie wheels 63 to maintain the track in alignment, are designed to cooperate with the upstanding ribs 139 on the shoes to control the clamping action of the band sections 113 to the shoes. This construction eliminates the need for providing spacers on the mounting bolts and thus permits the diameter of the mounting bolts to be increased. The retainers and shoes are also designed so that side loads applied to the retainers are transferred directly to the shoes through the lips 169 on the retainers and the ribs 139 on the shoes. This eliminates the application of the side loads to the track shoe insert mounting bolts 157.

The provision of a pair of hard rubber tires 77 spaced apart on the rims 73 of each bogie wheel 63 enables the tires to ride on the planar portions 135 of the shoes 131 and to straddle the sprocket tooth openings 133 formed in the shoes. The use of two spaced tires on each bogie wheel reduces heat build up and eliminates the hard rubber of the tires from being forced or drawn through the sprocket openings. The bogie wheels 63 also provides support for the tracks 61 during both their upper and lower paths of travel around the sprockets and tensioning wheels. The tensioning wheels are provided with pairs of hard rubber tires 83 for the same reasons.

The attachment of the pairs of bogie wheels 63 to the pivotally mounted carriages 69 allows the tracks to pass over obstructions without tilting or tipping the paving machine. The pivoting of the carriages is limited by stops (not shown) attached to the frame 33. To provide additional flexibility of the track means, the bogie carriages are mounted on shafts 71 which extend across the vehicle and are fastened to the frame. In effect, this provides a six point suspension for the bogie wheels. The frame 33 is built without diagonal cross-bracing to be torsionally flexible to accommodate this type of mounting.

To reduce the transmission maintenance and to protect it against damage, the gear trains between the three speed transmissions 204 and the sprockets 67 are completely enclosed in housings 191. This construction eliminates open chain drives and the problems inherent with such drives. In addition to driving the tracks 61, the drive sprockets 67 engage and support the track shoes 131 through means of the segmented rims 185 which engage the planar surfaces 135 on the shoes. The sprockets therefore maintain a constant pitch diameter for the tracks and eliminates side roll of the tracks as they go around the drive sprockets.

The closed center hydraulic system includes the variable volume, constant pressure pump 291 and the manifold 297. This pump, which is a pressure compensated pump, delivers a variable volume of hydraulic fluid. The volume delivered by the pump increases as the demand increases and decreases as the demand decreases. Although the output volume of the pump varies, the pressure remains constant. Hydraulic fluid is supplied to each actuator independently from the manifold. The advantage of the closed center system is that the hydraulic fluid is available at a predetermined pressure to any one of the actuators, independent of any of the other actuators.

The engine speed control mechanism shown in FIG. 17 automatically brings the speed of the engine 47 from idle to full operating speed and from full operating speed to idle automatically upon movement of either the hydrostatic transmission speed control levers 337.

We claim:

1. In a ground engaging track for a vehicle, with said track having a pair of laterally-spaced, longitudinally-extending bands disposed parallel to each other, the combination which comprises a plurality of ground engaging shoes spaced-apart longitudinally of said track and connected to both bands thereof, each of said shoes having a pair of recessed portions for receiving ground engaging inserts on the side thereof opposite said bands and extending substantially over the entire transverse extent of said track, each of said shoes having a centrally disposed opening at a point midway between each side of said track for receiving a driving force therefore, and in which the ground engaging surface of said shoes is comprised of a ground engaging insert disposed in each of said recessed portions with each of said inserts extending from one side edge of said tract to said opening.

2. Apparatus as recited in claim 1, in which each of said inserts is comprised of a steel plate with a resilient pad molded thereon, and including a plurality of bolts affixed to said plate and extending through said shoes and said bands for holding said shoes and said inserts in place along said dual track.

3. Apparatus as recited in claim 1, in which each of said inserts is comprised of a steel plate with a resilient pad molded thereon, and including a plurality of bolts affixed to said plate and extending through said shoes and said bands for holding said shoes and said inserts in place along said track.

4. In a track for a ground engaging vehicle having longitudinally extending bands formed of a plurality of spaced-apart steel cables extending lengthwise in each band, and said cables being embedded in resilient materials; and a plurality of ground engaging shoes spaced-apart longitudinally of said track; the combination which comprises plurality of track retainers disposed at the intersection of each of said shoes with said bands, and disposed on the side of said bands limiting compression forces on said bands between said shoes and said retainers; each of said shoes having a resilient pad insert with said insert including a steel plate with a resilient pad molded thereon; and a plurality of bolts affixed to said plates and extending through said shoes, said bands and said retainers preventing relative movement therebetween.

5. Apparatus as recited in claim 4, in which said limiting means includes a pair of spaced-apart abutments extending from said shoes around opposed sides of said bands forming a band retaining space therebetween, the ends of said abutments forming surfaces for engaging said retainers.

6. Apparatus as recited in claim 5, which includes a ground engaging vehicle having a plurality of track engaging wheels thereon, an opening disposed in each of said shoes, and a drive sprocket mounted on said paving machine with teeth for engaging the said openings in said shoes 7. Apparatus as recited in claim 6, in which each of said retainers has lateral load engaging means thereon for engaging the sides of said plurality of track engaging wheels.

8. Apparatus as recited in claim 7, in which said lateral engaging means includes a bracket disposed on each of said retainers, said bracket being disposed in a plane so that the wheel engaging surface thereof is at an angle greater than 90° from the axis of said engaged wheels, and further includes an extension thereon for cooperation with one of said spaced-apart shoe abutments to transfer said lateral loads directly to said shoes.

9. The apparatus of claim 4, further characterized in that said sprocket is formed with at least one rim means adapted to engage and support said metal shoe when said sprocket tooth meshes with said opening.

10. The apparatus of claim 9, further characterized in that said rim means is segmented with each segment of said rim aligned with a tooth of said sprocket.

* * * * *